US010699154B2

(12) United States Patent
Han et al.

(10) Patent No.: US 10,699,154 B2
(45) Date of Patent: Jun. 30, 2020

(54) OPTIMIZING 360-DEGREE VIDEO STREAMING WITH VIDEO CONTENT ANALYSIS

(71) Applicant: AT&T Intellectual Property I, L.P., Atlanta, GA (US)

(72) Inventors: Bo Han, Bridgewater, NJ (US); Tan Xu, Bridgewater, NJ (US); Cheuk Yiu Ip, Metuchen, NJ (US)

(73) Assignee: AT&T Intellectual Property I, L.P., Atlanta ( * ) Notice: Subject to any disclaimer, the term of this patent is extended or adjusted under 35 U.S.C. 154(b) by 7 days.

(21) Appl. No.: 16/058,534

(22) Filed: Aug. 8, 2018

(65) Prior Publication Data

US 2020/0050884 A1 Feb. 13, 2020

(51) Int. Cl.
*G06K 9/46* (2006.01)
*G06K 9/32* (2006.01)
*G06F 3/01* (2006.01)
*H04N 13/117* (2018.01)
*H04N 5/232* (2006.01)

(52) U.S. Cl.
CPC .......... *G06K 9/4676* (2013.01); *G06F 3/012* (2013.01); *G06K 9/3233* (2013.01); *H04N 5/23238* (2013.01); *H04N 13/117* (2018.05)

(58) Field of Classification Search
CPC .......... H04N 19/597; H04N 21/21805; G06K 9/4676; G06K 9/3233
See application file for complete search history.

(56) References Cited

U.S. PATENT DOCUMENTS 9,043,848 B2  5/2015  Michael et al.
9,781,342 B1  10/2017  Turley et al.
(Continued)

FOREIGN PATENT DOCUMENTS

WO    2018035133 A1   2/2018

OTHER PUBLICATIONS

Dambra, Savino et al., "Film Editing: New Levers to Improve VR Streaming", https://www.i3s.unice.fr/~sassatelli/articles/DSSPAP_2018.pdf, Jun. 12-15, 2018, 13 pages.
(Continued)

*Primary Examiner* — John J Lee
(74) *Attorney, Agent, or Firm* — Guntin & Gust, PLC; Robert Gingher

(57) ABSTRACT

Aspects of the subject disclosure may include, for example, a method performed by a processing system of determining a present orientation of a display region presented at a first time on a display of a video viewer, predicting a future orientation of the display region occurring at a second time based on data collected, to obtain a predicted orientation of the display region to be presented at the second time on the display of the video viewer, identifying, based on the predicted orientation of the display region, a first group of tiles from a video frame of a panoramic video being displayed by the video viewer, wherein the first group of tiles covers the display region in the video frame at the predicted orientation, and a plurality of objects moving in the video frame from the first time to the second time, wherein each object of the plurality of objects is located in a separate spatial region of the video frame at the second time, wherein a second group of tiles collectively covers the separate spatial regions, wherein tiles in the first group of tiles and tiles in the second group of tiles are different, and facilitating wireless transmission of the first group of tiles and a second tile from the second group of tiles, for presentation at the video viewer at the second time. Other embodiments are disclosed.

20 Claims, 13 Drawing Sheets

(56) References Cited

U.S. PATENT DOCUMENTS

| | | | |
|---|---|---|---|
| 9,986,221 B2 | 5/2018 | Zhou | |
| 10,298,653 B1* | 5/2019 | Cheng | H04L 65/4084 |
| 2013/0259375 A1* | 10/2013 | Dunlop | G06K 9/00684 |
| | | | 382/173 |
| 2017/0078447 A1 | 3/2017 | Hancock et al. | |
| 2017/0104927 A1 | 4/2017 | Mugavero et al. | |
| 2017/0180800 A1* | 6/2017 | Mayrand | H04N 21/44218 |
| 2017/0206702 A1 | 7/2017 | Choi et al. | |
| 2017/0332064 A1 | 11/2017 | Martineau et al. | |
| 2018/0103199 A1 | 4/2018 | Hendry et al. | |
| 2018/0115706 A1 | 4/2018 | Kang et al. | |
| 2018/0146121 A1 | 5/2018 | Hensler et al. | |
| 2018/0146198 A1 | 5/2018 | Atluru et al. | |
| 2019/0104324 A1* | 4/2019 | Han | G06T 19/006 |

OTHER PUBLICATIONS

Graf, Mario et al., "Towards bandwidth efficient adaptive streaming of omnidirectional video over http: Design, implementation, and evaluation", Proceedings of the 8th ACM on Multimedia Systems Conference, ACM, 2017.

Han, et al., U.S. Appl. No. 15/901,609, filed Feb. 21, 2018, entitled "System and Method of Predicting Field of View for Immersive Video Streaming", 64 pages.

Petrangeli, Stefano et al., "An HTTP/2-Based Adaptive Streaming Framework for 360 Virtual Reality Videos", Proceedings of the 2017 ACM on Multimedia Conference, ACM, 2017., Oct. 23-27, 2017, 9 pages.

Qian, Feng et al., "Optimizing 360 Video Delivery Over Cellular Networks", Proceedings of the 5th Workshop on All Things Cellular: Operations, Applications and Challenges, ACM, 2016., Oct. 3-7, 2016, 6 pages.

Samsung, "Specifications—Samsung Gear VR With Controller", http://www.samsung.com/global/galaxy/gear-vr/specs/, Aug. 8, 2018, 8 pages.

Sony, "Playstation VR Full Specifications", https://www.playstation.com/en-us/explore/playstation-vr/tech-specs/, Aug. 8, 2018, 5 pages.

Wikipedia, "Saliency Map", http://www.scholarpedia.org/article/Saliency_map, Feb. 2, 2015, 5 pages.

Zhou, Chao, "A Measurement Study of Oculus 360 Degree Video Streaming", MMSys'17, Jun. 20-23, 2017, Taipei, Taiwan, 11 pages.

* cited by examiner

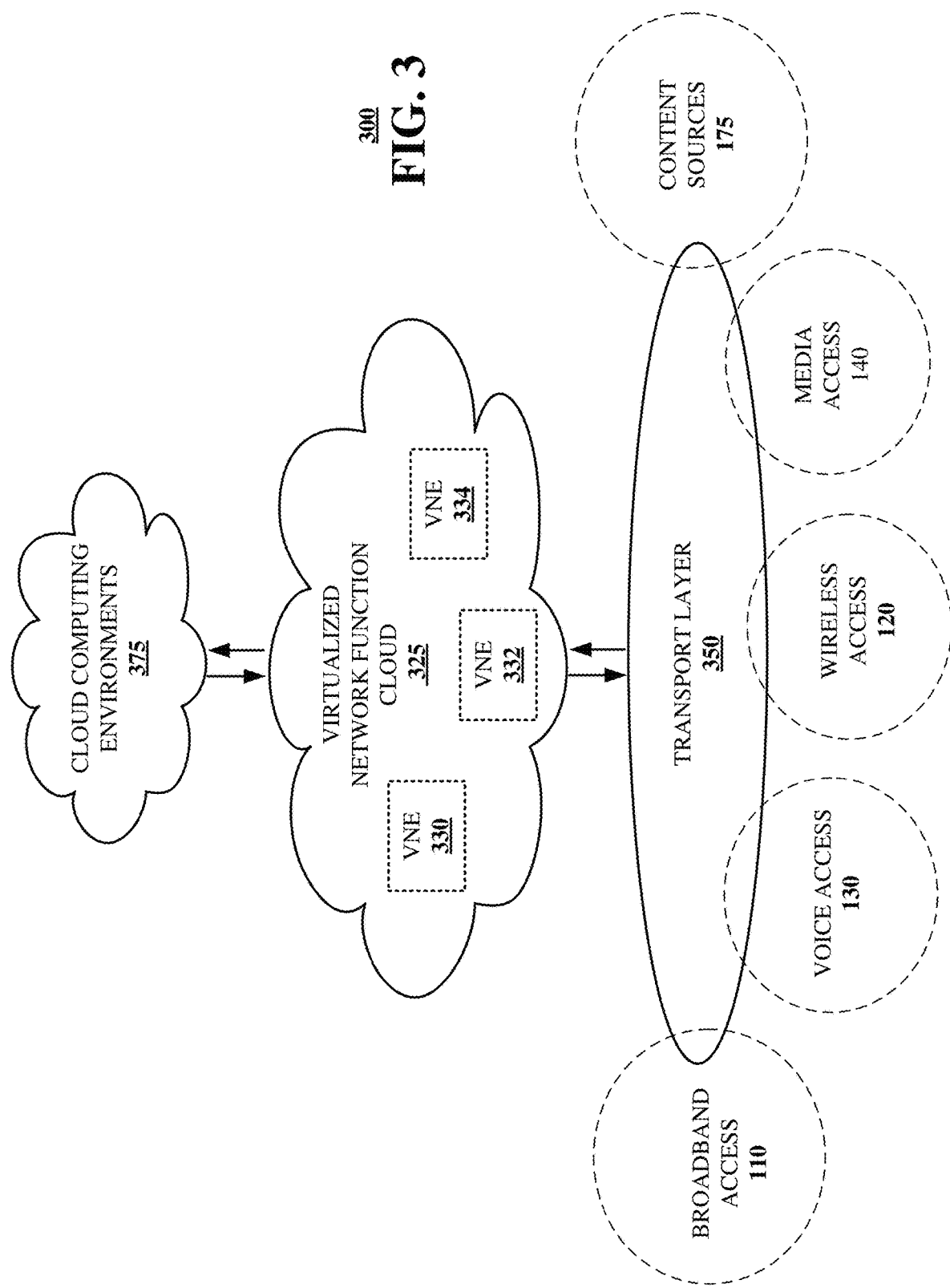

OPTIMIZING 360-DEGREE VIDEO STREAMING WITH VIDEO CONTENT ANALYSIS

FIELD OF THE DISCLOSURE

The subject disclosure relates to optimizing 360-degree video streaming by content analysis.

BACKGROUND 360-degree video, also known as panoramic or immersive video, is a critical component in the Virtual Reality (VR) ecosystem. 360-degree videos, provide users with a panoramic view that allows the viewer to freely control their viewing directions during video playback. Spherical videos are recorded by omnidirectional cameras or camera array systems (e.g., FACEBOOK® Surround 360). The camera array simultaneously records all 360 degrees of a scene that can be "wrapped" onto a 3D sphere, with the camera array at its center. Spherical videos provide users with panoramic views and create a unique viewing experience in particular when used in combination with the 3D video technology. 360-degree videos are becoming increasingly popular on commercial video content platforms such as YouTube, Facebook, and Periscope. In a typical 360 video system, a user wearing a VR headset can freely change her viewing direction. Technically, the user is situated in the center of a virtual sphere, and the panoramic contents downloaded from video servers are projected onto the sphere (e.g., using equirectangular projection).

When watching a spherical video, a viewer at the spherical center can freely control her viewing direction, so each playback creates a unique experience. Normally, a player displays only a visible portion of a spherical video, known as a field of view (FoV). The user's viewport (visible area) is determined by her viewing direction (in latitude/longitude) and the FoV of the VR headset in real time. The FoV defines the extent of the observable area, which is usually a fixed parameter of a VR headset.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein;

DETAILED DESCRIPTION

Figure 1:
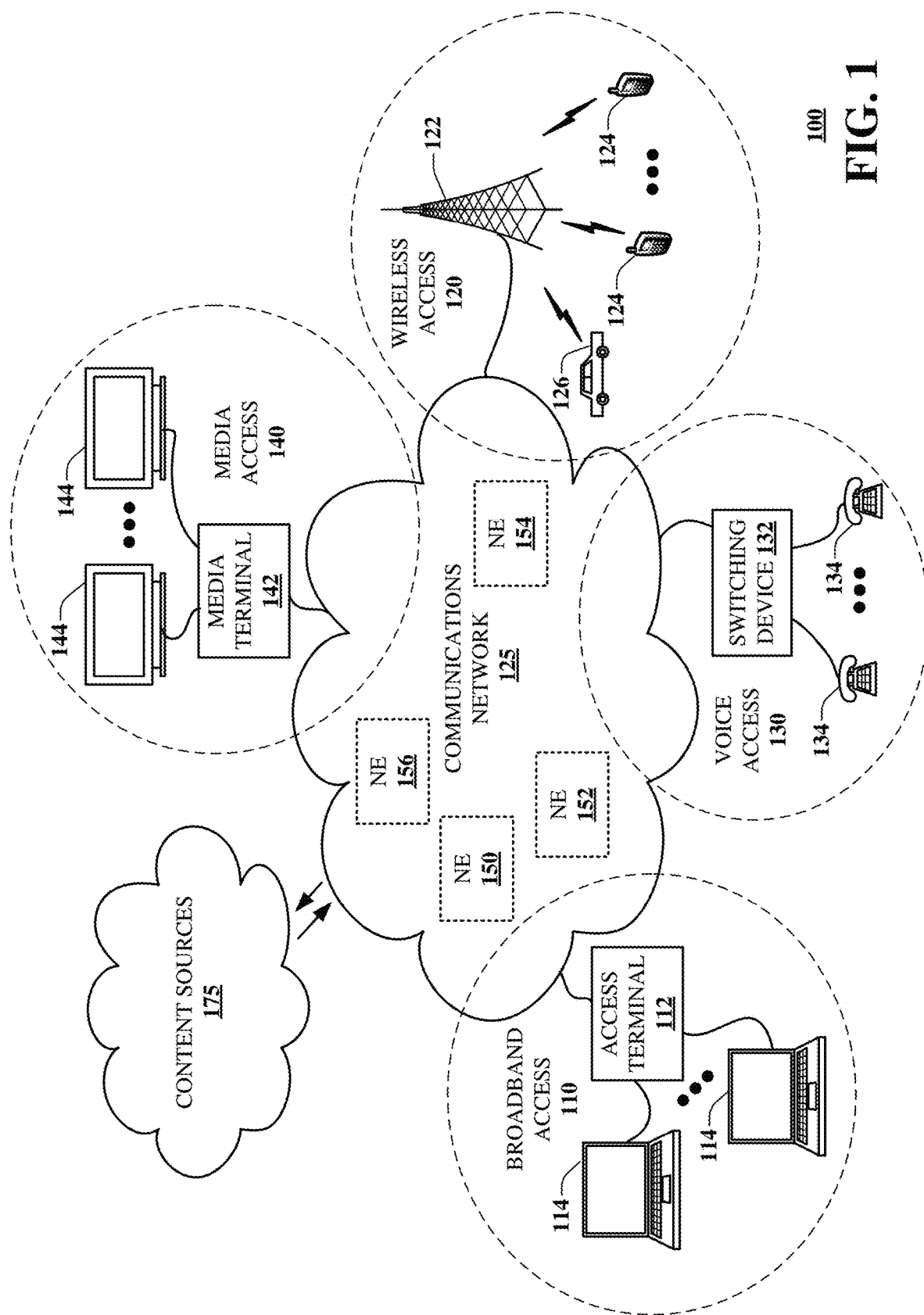
FIG. 1 is a block diagram illustrating an example, non-limiting embodiment of a communications network in accordance with various aspects described herein.

The subject disclosure describes, among other things, illustrative embodiments for optimizing 360-degree video streaming by analyzing the content of the 360-degree video. Other embodiments are described in the subject disclosure.

One or more aspects of the subject disclosure include a device that includes a processing system including a processor; and a memory that stores executable instructions that, when executed by the processing system, facilitate performance of operations, the operations comprising: collecting data corresponding to changes in a field-of-view for a video viewer, wherein the data is input by a user viewing a panoramic video on the video viewer; determining a present orientation of a display region presented at a first time on a display of the video viewer; predicting a future orientation of the display region occurring at a second time based on the data collected, to obtain a predicted orientation of the display region to be presented at the second time on the display of the video viewer; identifying, based on the predicted orientation of the display region and the field-of-view, a first spatial region of a video frame of the panoramic video corresponding to the second time, wherein the video frame comprises the first spatial region; identifying a plurality of objects moving in the video frame from the first time to the second time, wherein a first object of the plurality of objects is located in a second spatial region of the video frame at the second time; and facilitating wireless transmission of a first group of tiles covering the first spatial region of the video frame and a second tile covering the second spatial region of the video frame to the video viewer before the second time, for potential presentation at the video viewer at the second time, wherein the first spatial region and the second spatial region are non-overlapping.

One or more aspects of the subject disclosure include a machine-readable medium, comprising executable instructions that, when executed by a processing system including a processor, facilitate performance of operations, the operations comprising: collecting data corresponding to changes in a field-of-view for a video viewer, wherein the data is input by a user viewing a panoramic video on the video viewer; determining a present orientation of a display region presented at a first time on a display of the video viewer; predicting a future orientation of the display region occurring at a second time based on the data collected, to obtain a predicted orientation of the display region to be presented at the second time on the display of the video viewer; identifying, based on the predicted orientation of the display region and the field-of-view, a first spatial region of a video frame of the panoramic video corresponding to the second time, wherein the video frame comprises the first spatial region, and wherein a first group of tiles covers the first spatial region; identifying a plurality of objects moving in the video frame from the first time to the second time, wherein each object of the plurality of objects is located in a separate spatial region of the video frame at the second time, wherein a second group of tiles collectively covers the separate spatial regions, wherein tiles in the first group of tiles and tiles in the second group of tiles are different; generating a heatmap for the video frame corresponding to the second time; identifying, based on the heatmap, a third group of tiles comprising points of interest in the video frame at the second time, wherein tiles in the third group of tiles are different from tiles in the second group of tiles and tiles in the first group of tiles; generating a saliency map for the video frame corresponding to the second time; identifying, based on the saliency map, a fourth group of tiles comprising points of interest in the video frame at the second time, wherein tiles in the fourth group of tiles are different from tiles in the third group of tiles, tiles in the second group of tiles and tiles in the first group of tiles; and facilitating wireless transmission of the first group of tiles, a second tile from the second group of tiles, a third tile from the third group of tiles, and a fourth tile from the fourth group of tiles for presentation at the video viewer at the second time.

One or more aspects of the subject disclosure include a method performed by a processing system of determining a present orientation of a display region presented at a first time on a display of a video viewer, predicting a future orientation of the display region occurring at a second time based on data collected, to obtain a predicted orientation of the display region to be presented at the second time on the display of the video viewer, identifying, based on the predicted orientation of the display region, a first group of tiles from a video frame of a panoramic video being displayed by the video viewer, wherein the first group of tiles covers the display region in the video frame at the predicted orientation, and a plurality of objects moving in the video frame from the first time to the second time, wherein each object of the plurality of objects is located in a separate spatial region of the video frame at the second time, wherein a second group of tiles collectively covers the separate spatial regions, wherein tiles in the first group of tiles and tiles in the second group of tiles are different, and facilitating wireless transmission of the first group of tiles and a second tile from the second group of tiles, for presentation at the video viewer at the second time.

Referring now to FIG. 1, a block diagram is shown illustrating an example, non-limiting embodiment of a communications network 100 in accordance with various aspects described herein. For example, communications network 100 can facilitate in whole or in part processing operations described below and the wireless transmission of tiles to a mobile device. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
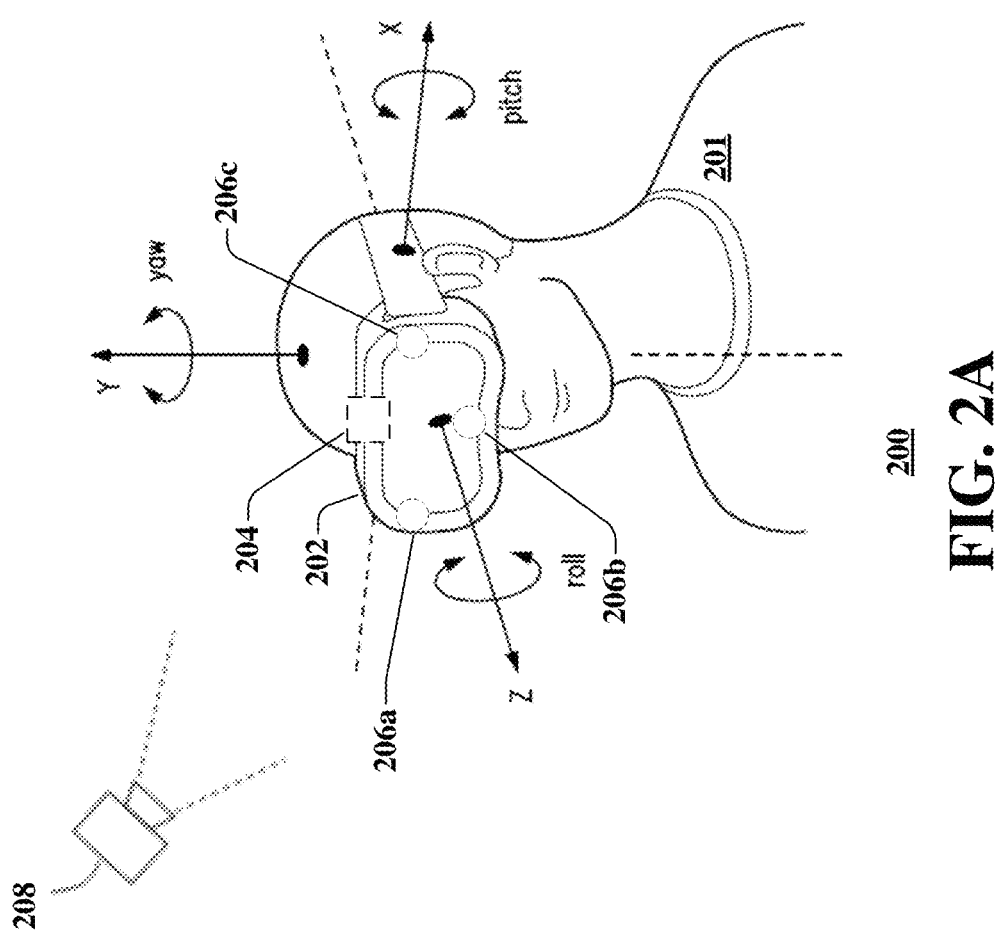
FIG. 2A depicts an illustrative embodiment of a spherical video viewing device in accordance with various aspects described herein.

FIG. 2A depicts an illustrative embodiment of a spherical video viewing device 200. As shown in FIG. 2, a user 201 wearing a VR headset 202 can adjust her orientation by changing the pitch, yaw, and/or roll of the VR headset 202, which correspond to rotating along one or more of the X, Y, and Z axes, respectively. Then a 360-degree video player, e.g., within the VR headset 202, computes and displays a viewing area, i.e., a display surface, based on the orientation and the field of view (FoV). The FoV can define an extent of the observable area, which is usually a fixed parameter of a VR headset (e.g., 110° horizontally and 90° vertically).

The example VR headset 202 can be equipped with a position and/or orientation sensor 204, such as position/orientation sensors available on smartphones, gaming goggles and/or tablet devices. Alternatively or in addition, the VR headset 202 includes one or more reference markers 206a, 206b and 206c (generally 206). The reference markers 206a, 206b, 206c are spaced apart in a predetermined configuration. An external sensor, such as a video camera 208, is positioned to observe the VR headset 202 during active use. The video camera 208 detects positions of the reference markers. Further processing, e.g., by an orientation detector can determine a position and/or orientation of the VR headset 202 based on the detected/observed positions of the reference markers 206.

As an important component of the virtual reality (VR) technology, spherical videos provide users 201 with panoramic views allowing them to freely control their viewing direction during video playback. Usually, a VR headset 202 displays only the visible portion of a spherical video. It should be noted that spherical videos can be played back on other platforms besides the example of a VR headset 202, such as computers, gaming consoles, or media players, with other devices providing control of FoV, such as a mouse, touchpad, or remote control. However, fetching the entire raw video frame wastes bandwidth. The techniques disclosed herein address the problem of optimizing spherical video delivery over wireless, e.g., cellular, networks. A measurement study was conducted on commercial spherical video platforms. A cellular-friendly streaming scheme is disclosed that delivers only a spherical video's visible portion based on head movement prediction. Viewing data collected from real users was used to demonstrate feasibility of an approach that can reduce bandwidth consumption by up to 80% based on a trace-driven simulation.

Conceptually, a novel cellular-friendly streaming scheme for spherical videos avoids downloading an entire spherical video, instead only fetching those parts, e.g., spatial segments or portions, of the spherical video that are visible to the user 201 in order to reduce bandwidth consumption associated with the video transfer. As display of any of the portion of the spherical video requires that the portion be fetched or otherwise downloaded, the disclosed approach benefits from a prediction of a viewer's head movement (to determine which portion of the spherical video view to fetch). Trace-driven analysis indicated that, at least in the short term, a viewers' head movement can be accurately predicted, e.g., with an accuracy >90%, by even using simple methods such as linear regression.

Maintaining good Quality of Experience (QoE) for 360° videos over bandwidth-limited links on commodity mobile devices remains challenging. First, 360° videos are large: under the same perceived quality, 360° videos have around 5× larger sizes than conventional videos. Second, 360° videos are complex: sophisticated projection and content representation schemes may incur high overhead. For example, the projection algorithm used by Oculus 360 requires servers to maintain up to 88 versions of the same video. See Zhou, et al., A Measurement Study of Oculus 360 Degree Video Streaming (Proceedings of MMSys, 2017), which is incorporated by reference herein. Third, 360° videos are still under-explored: there is a lack of real-world experimental studies of key aspects such as rate adaptation, QoE metrics, and cross-layer interactions (e.g., with TCP and web protocols such as HTTP/2).

Spherical videos are very popular on major video platforms such as YOUTUBE® and FACEBOOK® platforms. Despite their popularity, the research community appears to lack an in-depth understanding of many of its critical aspects such as performance and resource consumption. To a large extent, spherical video inherits delivery schemes from traditional Internet videos. This simplifies the deployment, but makes spherical video streaming very cellular-unfriendly, because the video player always fetches the entire video including both visible and invisible portions. This leads to tremendous resource inefficiency on cellular networks with limited bandwidth, metered link, fluctuating throughput, and high device radio energy consumption. To address this issue, existing solutions have been focusing on either monolithic streaming or tile-based streaming. Monolithic streaming delivers uniformly encoded panoramic views and is widely used by most commercial 360-degree video content providers. For more advanced schemes that perform viewport adaptation, a 360-degree video has multiple versions each having a different scene region, called Quality Emphasized Region (QER), with a high encoding rate. A player picks the right version based on the view's head orientation. One practical issue of this scheme is that it incurs significant overhead at the server side (e.g., the solution from Facebook Oculus 360 mentioned above).

Figure 2B:
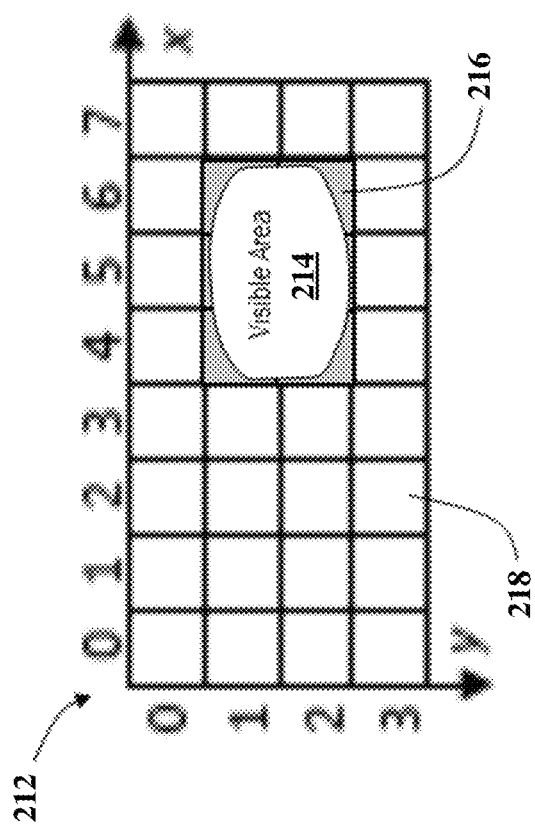
FIG. 2B depicts an illustrative embodiment of spatial segmentation of a video chunk into tiles in accordance with various aspects described herein.

FIG. 2B depicts an illustrative embodiment of spatial segmentation of a video chunk for tile-based spherical video streaming. Each 360 video chunk is pre-segmented into multiple smaller chunks, which are called tiles. Each spherical video chunk is pre-segmented into multiple smaller chunks, which are called tiles. A tiling scheme spatially segments a 360-degree video into tiles and deliver only tiles overlapping with predicted FoVs. To increase the robustness, a player can also fetch the rest of the tiles at lower qualities. A tile has the same duration as a chunk while only covering a subarea of the chunk. The easiest way to generate the tiles is to evenly divide a chunk containing projected raw frames into m×n rectangles each corresponding to a tile. FIG. 2B illustrates an example pre-segmented chunk 212, where m=8 and n=4, resulting in 32 tiles 218 and where the visible area, θ is illustrated as a bounded display region 214. The client may only request the six tiles 216 ($4 \leq x \leq 6$; $1 \leq y \leq 2$) overlapping with the display region 214. Note that due to projection, despite the viewer's FoV being fixed, the size of the display region 214 and thus the number of requested tiles 216 may vary. Compared to FoV-agnostic approaches, tiling offers significant bandwidth saving, which has been demonstrated through trace-driven simulations. Note that the tiling scheme can be applied to not only videos using equi-rectangular projection, but also those with Cube Map projection.

Besides the above approach, an alternative and more complex way is to apply segmentation directly on a projection surface, such as a 3D sphere of a spherical video, instead of on a projected 2D raw frame of pre-segmented chunk 212 so that each tile covers a fixed angle, e.g., a fixed solid angle. This makes the number of tiles to be requested irrespective of user's viewing direction (but their total bytes may still vary).

Performing the spatial segmentation of spherical video frames offline can reduce and/or otherwise eliminate server-side overhead. Multiple tiles can be requested in a single bundle to reduce network roundtrips. A tiles' metadata such as positions and/or addresses (e.g., web addresses or URLs) can be embedded in a metafile exchanged at the beginning of a video session.

If a viewer's head movement during a spherical video session is known beforehand, an optimal sequence of tiles can be generated that minimizes the bandwidth consumption. To approximate this in reality, a prediction of head movement is determined, e.g., according to a pitch, yaw, and roll and/or a change of pitch, yaw, and roll. To approximate this in reality, predicting the future FoV by leveraging multiple sources, such as head movement, video content analysis and user profile. See, e.g., U.S. patent application Ser. No. 15/901,609, filed Feb. 21, 2018, entitled "SYSTEM AND METHOD OF PREDICTING FIELD OF VIEW FOR IMMERSIVE VIDEO STREAMING," which is incorporated by reference herein. Note that the FoV prediction method is a key building block to enable the true spatial immersion by delivering 4K+ quality videos, which usually require at least 25 Mbps bitrate (recommended by Netflix). It is challenging to achieve this high bitrate over the current network infrastructure with limited bandwidth.

In at least some embodiments, the predictions and/or selective video fetch of portions of spherical video frames can be integrated with DASH and/or HTTP. Although currently most spherical videos use progressive download, it is envisioned they may switch to a Dynamic Adaptive Streaming over HTTP (DASH). Extensive research has been conducted on improving the quality of experience (QoE) of DASH video. A DASH video is split into chunks encoded with multiple discrete bitrate levels; a video player can switch between different bitrate levels at a chunk boundary. In contrast, spherical videos involve more complexity, because the player needs to make decisions at both the temporal and spatial dimension.

An important component of a DASH scheme is its rate adaptation algorithm, which determines the quality level of chunks to fetch. Improved techniques for spherical video streaming over cellular networks disclosed herein reduce bandwidth consumption, preferably with little or no detrimental effects to playback observed by a VR headset 202 (see FIG. 2A). Basically, instead of downloading entire spherical video raw frames, a video client predicts the future FoV of a viewer and then fetches only the tiles in the FoV in order to optimize the bandwidth consumption.

By leveraging head movement traces, for example, we use a sliding window of 1 second from T−1 to T to predict future head position (and thus the FoV) at T+δ for each dimension of yaw, pitch, and roll. Another key data source of FoV prediction is the video content itself which can be analyzed through either the statistic from crowdsourced viewing data or object-feature detection from the actual video frames. Popular spherical videos from commercial content providers and video-sharing websites attract a large number of viewers. Also, users' viewing behaviors are often affected by the video content. This is also true for spherical videos: at certain scenes, viewers are more likely to look at a certain spots or directions, and thus we can predict the FoV based on the crowdsourced viewing statistical information. By employing object-feature detection, the video can be analyzed. For example, when watching soccer and tennis videos, most likely viewers will follow the movement of the soccer, key players and tennis balls. Thus, if we can detect the soccer and tennis balls, key soccer players and referee, we may be able to achieve a high accuracy of FoV prediction.

Moreover, existing work has demonstrated that it is possible to model the video viewing behavior of users by leveraging stochastic models such as Markovian model. The model can be constructed using actions from a user when viewing a spherical video, including pause, stop, jump, forward and rewind. This type of user profile complements the head-movement based and video content analysis assisted FoV prediction. Even if a user does not change the view direction, the FoV may change dramatically if a forward/rewind action is issued by the viewer. The stochastic models of video viewing behavior can help improve the accuracy of FoV prediction. The future FoV prediction can also leverage the personal interest of a user. For example, if we know from the profile that a user does not like thrilling scenes, very likely he/she will skip this type of content when watching a spherical video. Thus, the probability of predicting a FoV from these scenes will be low.

Ideally, if a viewer's future FoV during a 360 video session is known beforehand, the optimal sequence of tiles can be generated that minimizes bandwidth consumption. To approximate this in reality, a future FoV can be predicted by historical viewport movement information. By leveraging head movement traces, for example, a sliding window of 1 second from T−1 to T can be used to predict future head position (and thus the FoV) at T+δ for each dimension of yaw, pitch, and roll.

Figure 2C:
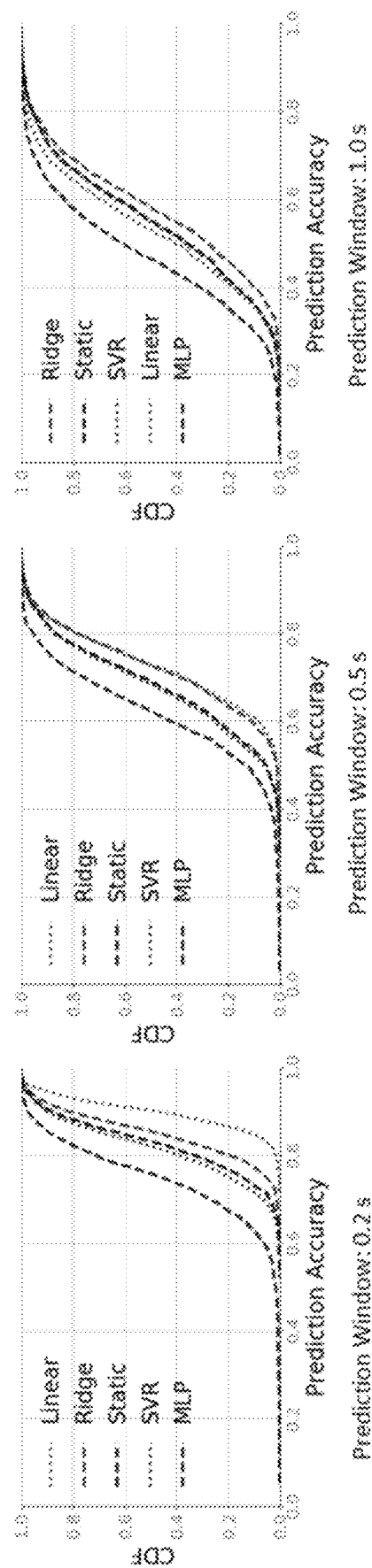
FIG. 2C is a diagram illustrating graphs that evaluate the prediction accuracy of various Machine Learning (ML) algorithms for various prediction windows in accordance with various aspects described herein.

FIG. 2C is a diagram illustrating three graphs that evaluate the prediction accuracy of various Machine Learning (ML) algorithms for three prediction windows, 0.2, 0.5 and 1 s. The ML algorithms were trained using data from historical head movement traces collected during a user study with more than 130 participants. Four ML algorithms were trained: 3 classical models and 1 neural network model. The classical models were: Linear Regression, Ridge Regression and Support Vector Regression (with rbf kernel). The neural network model was a Multi-Layer Perceptron. A simple heuristic, called Static, was also deployed, which assumes that the viewport does not change from T to T+δ. For a 4×6 segmentation scheme, the viewport prediction is accurate if the tile set determined by the predicted viewport is exactly the same as the ground truth.

The key take-away from FIG. 2C is that the viewport prediction accuracy depends heavily on the prediction window. The longer this window is, the lower the prediction accuracy. However, smaller prediction windows lead to a strict requirement on the end-to-end latency. Viewport prediction accuracy can be improved by leveraging video content analysis.

Another challenge for tile-based viewport adaptive 360-degree streaming is that mobile devices need to decode and combine multiple tiles for display. To increase the robustness of video streaming, existing solutions deliver tiles with a lower video encoding quality that may overlap with the predicted viewport. As a result, a mobile device will have to decode 24 tiles simultaneously for the 4×6 segmentation scheme. If a coarse-grained segmentation scheme, e.g., 2×4, is used, the total number of to-be-decoded-tiles is smaller.

Figure 2D:
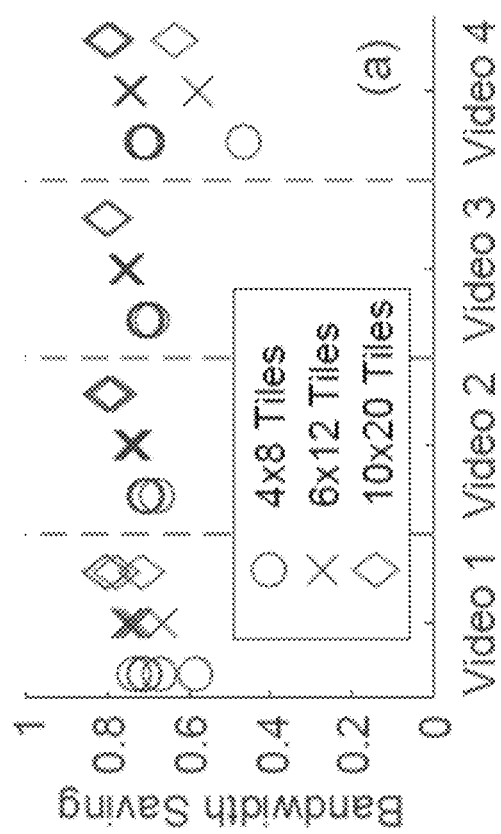
FIG. 2D is a diagram that plots bandwidth savings for different videos under various segmentation schemes using a trace-driven simulation study in accordance with various aspects described herein.

FIG. 2D is a diagram that plots bandwidth savings for four different videos under three segmentation schemes, 4×8, 6×12 and 10×20, using a trace-driven simulation study. As shown in FIG. 2D, network efficiency is lower for coarse-grained segments, which increases the amount of delivered content that will not be displayed.

However, decoding multiple tiles concurrently requires high computation power on mobile devices and may lead to high stall time, which significantly affect the quality of user experience. A tile-based 360-degree video player has been implemented on Android devices and the performance of the Full Deliver scheme proposed by Graf has been evaluated. See Graf, et al., "Towards bandwidth efficient adaptive streaming of omnidirectional video over HTTP: Design, implementation, and evaluation" (Proceedings of ACM MMSys, 2017), which is incorporated by reference herein. When running over a LTE network, the stall time for a 5-min video is higher than 200 s, mainly caused by the decoding overhead of multiple tiles (i.e., 24 tiles in this case). Video content analysis can be used to improve the content delivery efficiency. Such analysis may comprise, e.g., a saliency map, a heatmap, and motion tracking, to facilitate head movement based viewport prediction, and to decide which tile should be prioritized for delivery, caching and decoding for Video on Demand (VoD) applications.

Figure 2E:
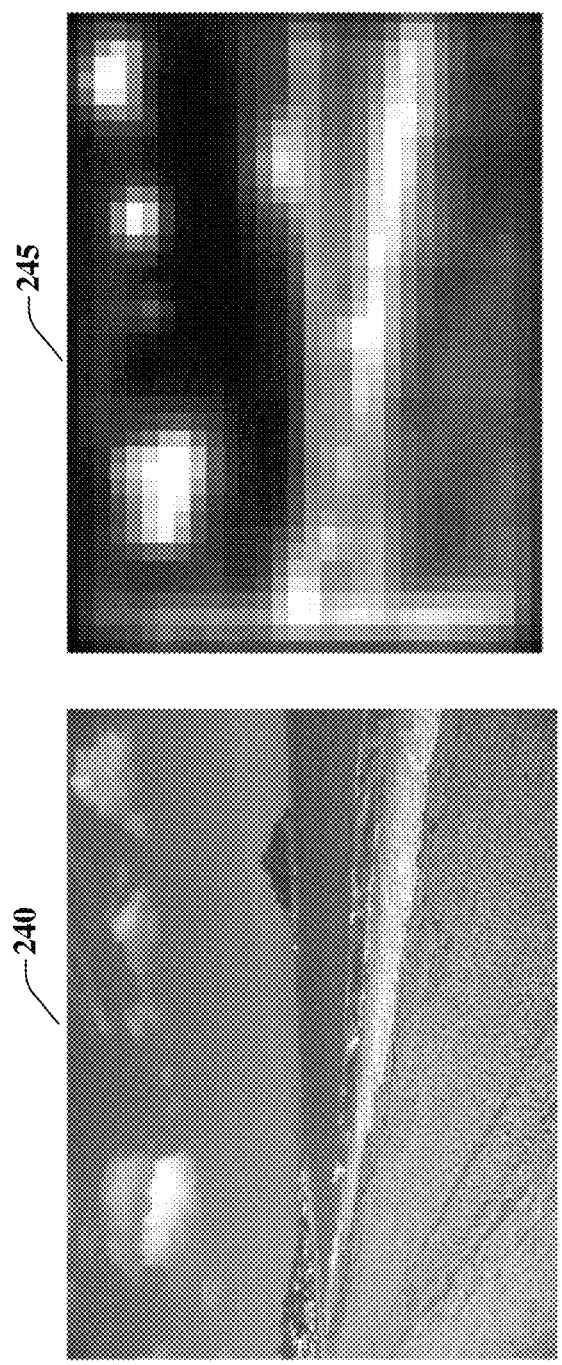
FIG. 2E is a diagram illustrating a visual scene and a corresponding saliency map in accordance with various aspects described herein.

FIG. 2E is a diagram illustrating a visual scene 240 and a saliency map 245 corresponding to the visual scene 240. A saliency map is an image that shows each pixel's unique quality. The saliency map 245 is a topographically arranged map that represents visual saliency of corresponding to the visual scene 240. See http://www.scholarpedia.org/article/Saliency_map, which is incorporated by reference herein. The goal of the saliency map 245 is to simplify and/or change the representation of an image into something that is more meaningful and easier to analyze. For example, potential Points of Interest (PoIs) can be identified in a saliency map.

Figure 2F:
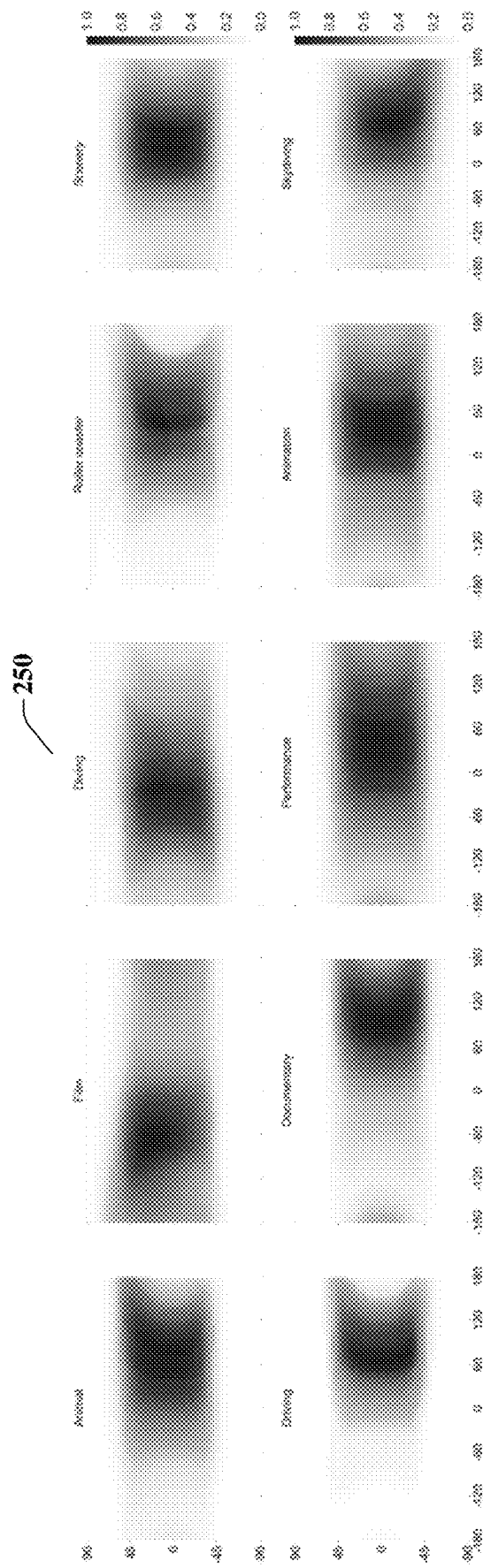
FIG. 2F is a diagram illustrating a heatmap of content access patterns for panoramic videos in accordance with various aspects described herein.

FIG. 2F is a diagram illustrating a heatmap 250 of content access patterns for ten 360-degree videos. Heatmap 250 is generated based on viewing statistics from a large number of viewers. The heatmaps of viewing density are based on the content access pattern from a large-scale user study conducted for ten popular 4K 360-degree videos from YouTube with at least 2 million views. FIG. 2F illustrates that there are certain areas with a very high viewing density (i.e., the hot areas) for almost all videos.

Figure 2G:
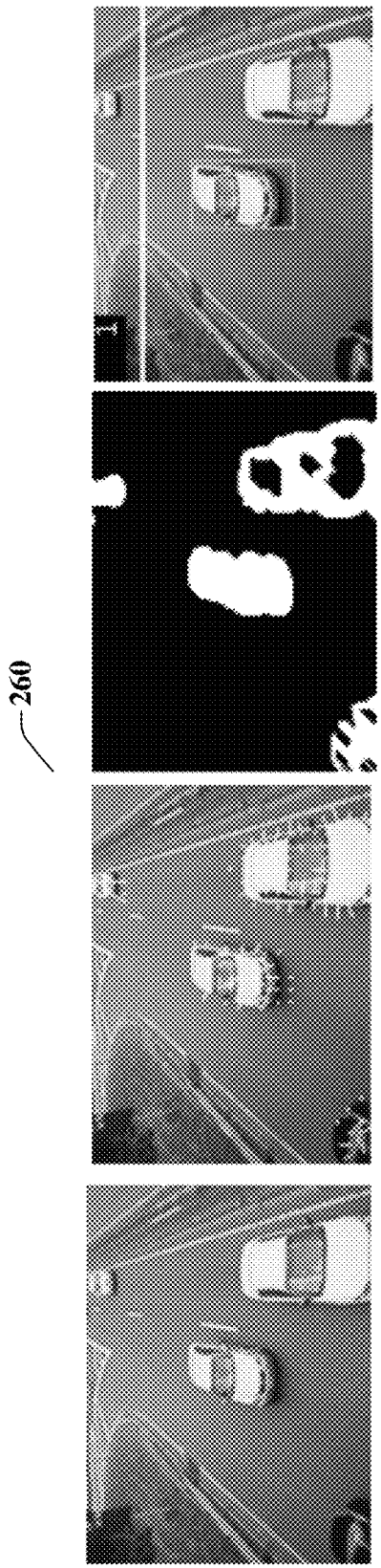
FIG. 2G is a diagram illustrating image processing for motion tracking in accordance with various aspects described herein.

FIG. 2G is a diagram illustrating image processing for motion tracking 260. In an embodiment, image recognition over a series of frames detects the apparent motion of objects, surfaces, and edges in a visual scene caused by the relative motion between an observer and a scene, known as optical flow. Optical flow has been used extensively for motion tracking in video content analysis, which estimates the motion vectors in each frame of a video sequence, as shown in FIG. 2G. Consider a 360-degree video of a soccer game. The objects tracked could be the soccer ball, key soccer players and referee. When watching these sports videos, most likely viewers will follow the movement of the soccer ball and/or their favorite players. Thus, motion tracking has the potential to boost the accuracy of viewport prediction.

Figure 2H:
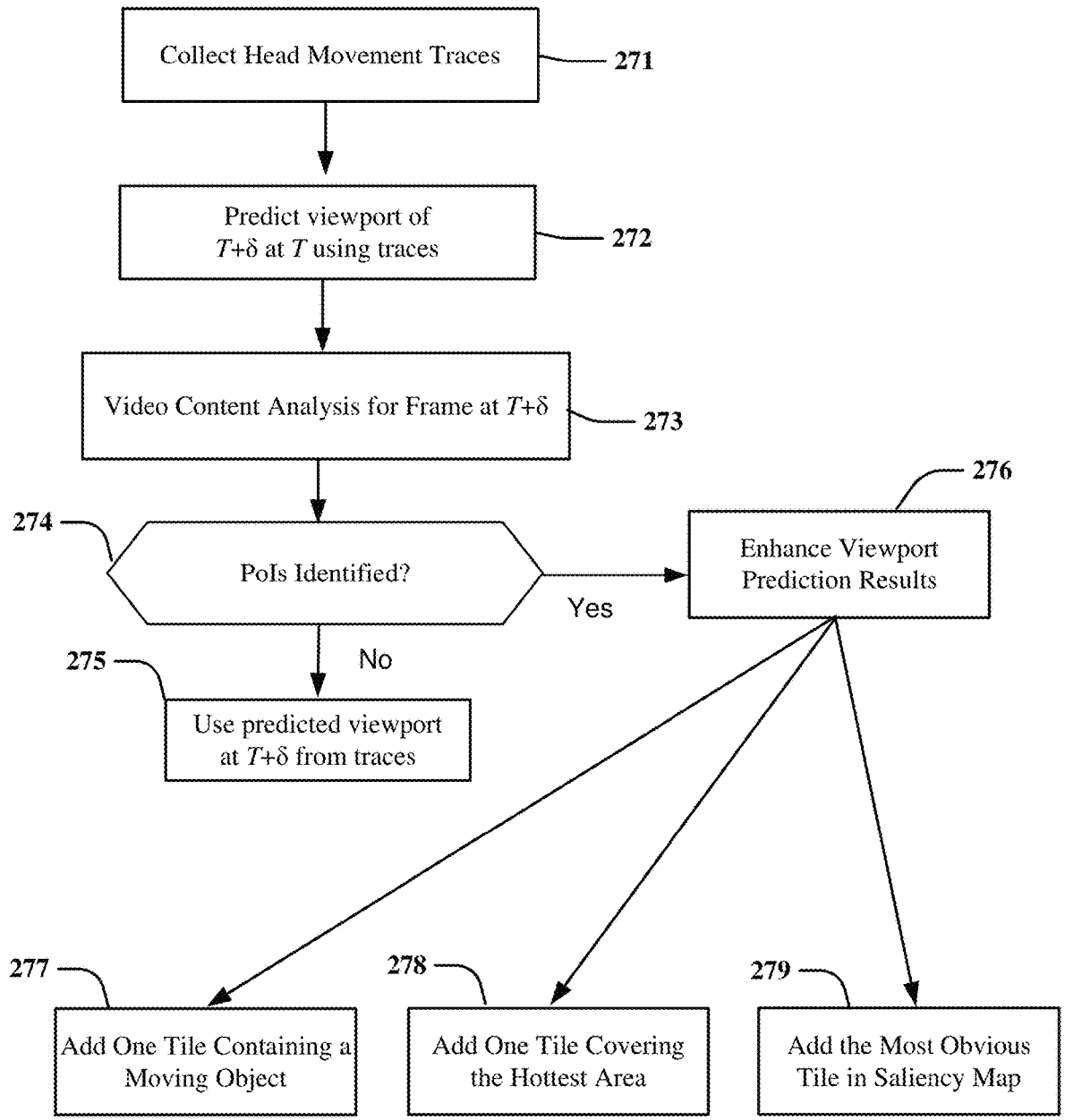
FIG. 2H depicts an illustrative embodiment of a method in accordance with various aspects described herein.

FIG. 2H depicts an illustrative embodiment of a method 270 in accordance with various aspects described below. FIG. 2H plots the workflow of how to improve the accuracy of viewport prediction using video content analysis. The process starts in the background, at step 271, where a mobile device keeps collecting head movement traces from built-in sensors. In step 272, at time T, a 360-degree video player running on the mobile device predicts the viewport at T+$\delta$ using the adaptive Machine Learning algorithm proposed in, for example, U.S. patent application Ser. No. 15/901,609, filed Feb. 21, 2018, entitled "SYSTEM AND METHOD OF PREDICTING FIELD OF VIEW FOR IMMERSIVE VIDEO STREAMING," which is incorporated by reference herein. The system determines tiles overlapping with predicted viewport based on the underlying segmentation scheme (e.g., 2×4, 4×6, or 4×8). In step 273, the content server performs video content analysis in advance and generate the saliency map and heatmap for the video frame at T+$\delta$ and conducts motion tracking for video frames from T to T+$\delta$. In step 274, the system checks to see if there are any PoIs identified. If there are no PoIs identified by the video content analysis, the process continues to step 275, where the video player uses only the collected head movement traces for viewport prediction. Note that the player can download the results of video content analysis along with the video content. If there are PoIs identified using video content analysis, then in step 276, the video player can enhance the viewport prediction by adding more to-be-fetched tiles as follows.

For example, suppose there are multiple objects identified by motion tracking. In step 277, the video player selects only one tile that is not yet in the to-be-fetched tile set determined by head movement based prediction and contains an object which satisfies the following condition: based on the moving trajectory of the object and the location of the object at T+$\delta$ that is a closest match, in other words, the nearest distance, to the historical head movement trajectory and the predicted viewport center at T+$\delta$. In step 278, when using the results from a heatmap generated by viewing statistics, the video player can choose another tile that is not yet in the list of to-be-fetched tiles and covers the hottest region in the heatmap. Finally, in step 279, the video player adds the most obvious tile from the most salient region in the saliency map, which is not selected in the above procedure.

In an embodiment, the system determines a priority order for delivery, caching and decoding of tiles in the to-be-fetched list. In terms of delivery, tiles at the transport layer can be prioritized (e.g., using priority queues) for in-network delivery. On the video content server side, priority can be enabled at either the application layer (e.g., using the priority scheme included in Hypertext Transfer Protocol Version 2) or in the Linux kernel to solve the head-of-line blocking. Regarding a caching scheme, tiles with a higher priority will be cached with a high probability than low priority tiles, especially when the cache size is limited. Similarly, when designing cache replacement policies, low priority tiles will be removed from the cache first when the cache is full. At the client side, usually the number of GPU accelerated video decoders is smaller than the number of to-be-decoded tiles. Thus, when designing the tile decoding scheduling algorithms, high priority tiles will be decoded first when the number of available decoder is limited.

Based on the discussion of priority order above, there are four types of tiles: tiles predicted using head movement traces (T-HM), tiles added via motion tracking results (T-MT), tiles identified by heatmap of content access patterns (T-HT), and tiles selected based on saliency map (T-SM). When improving the accuracy of viewport prediction, the size of the last three tile sets may only be one. The system can increase the size to k (e.g., 3 or 4) to prioritize the tiles when enhancing the content delivery efficiency. Note that although the size of the last three sets is increased, the sets are sorted according to the importance of these tiles, for example, based on the hotness in the heatmap. In an embodiment, five priority levels are defined as follows:

Highest priority: tiles in T-HM, T-MT, T-HT, and T-SM

Second priority: tiles in T-HM and two out of these three sets T-MT, T-HT, and T-SM Third priority: tiles in T-HM and one of these three sets T-MT, T-HT, and T-SM Fourth priority: tiles in T-HM, but not in any of these three sets T-MT, T-HT, and T-SM Lowest priority: the rest of the tiles Note that, the first three priority tile set identified using the above policy may be empty.

While for purposes of simplicity of explanation, the respective processes are shown and described as a series of blocks in FIG. 2H, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of communication network 100, the subsystems and functions of spherical video viewing device 200, and method 270 presented in FIGS. 1, 2A and 2H. For example, virtualized communication network 300 can facilitate in whole or in part predicting a future viewport of the video frame based on head movement traces, identifying points of interest, and enhancing viewport prediction results by analyzing moving objects, heatmaps and saliency maps of the video content.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
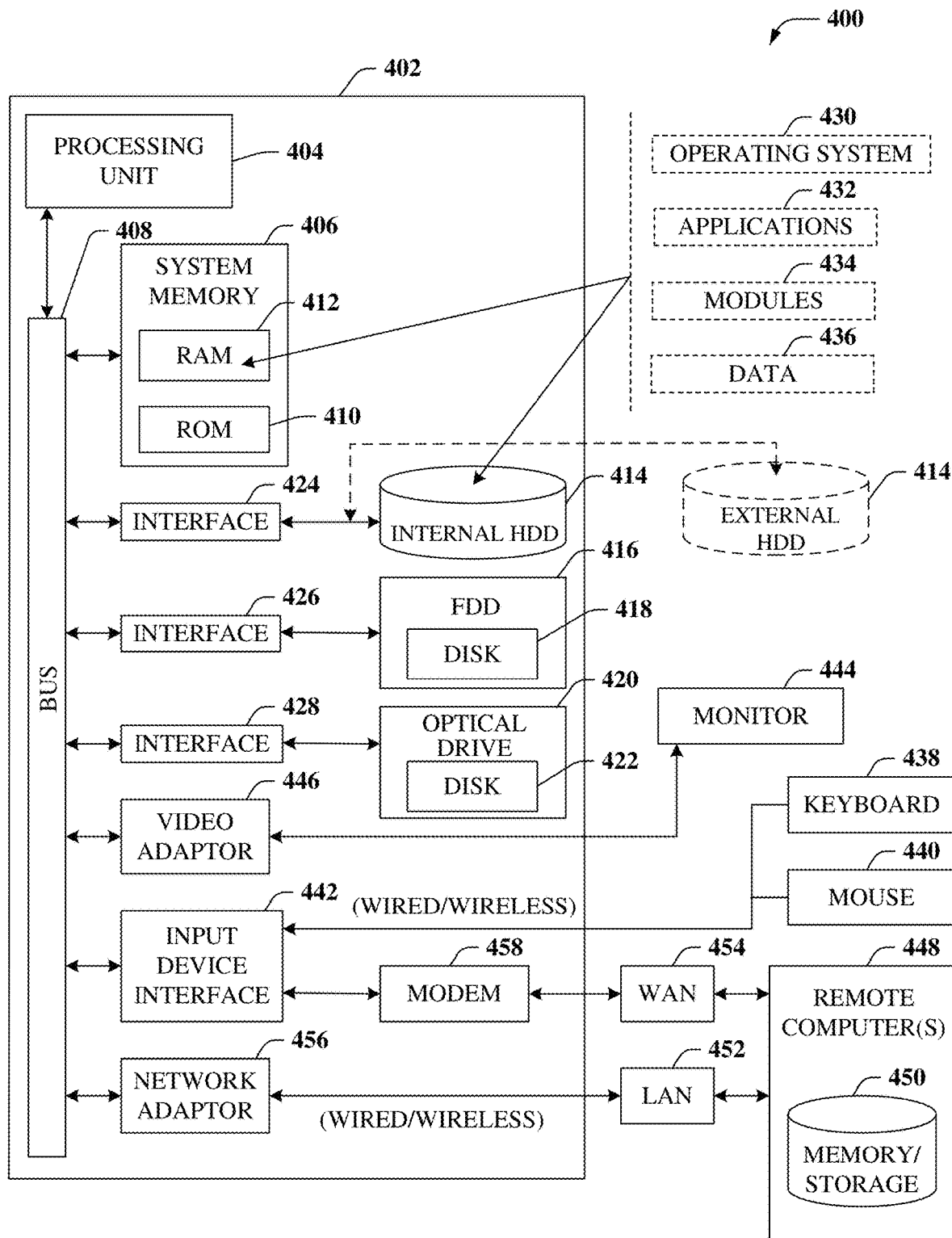
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part predicting a future viewport of the video frame based on head movement traces, identifying points of interest, and enhancing viewport prediction results by analyzing moving objects, heatmaps and saliency maps of the video content.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
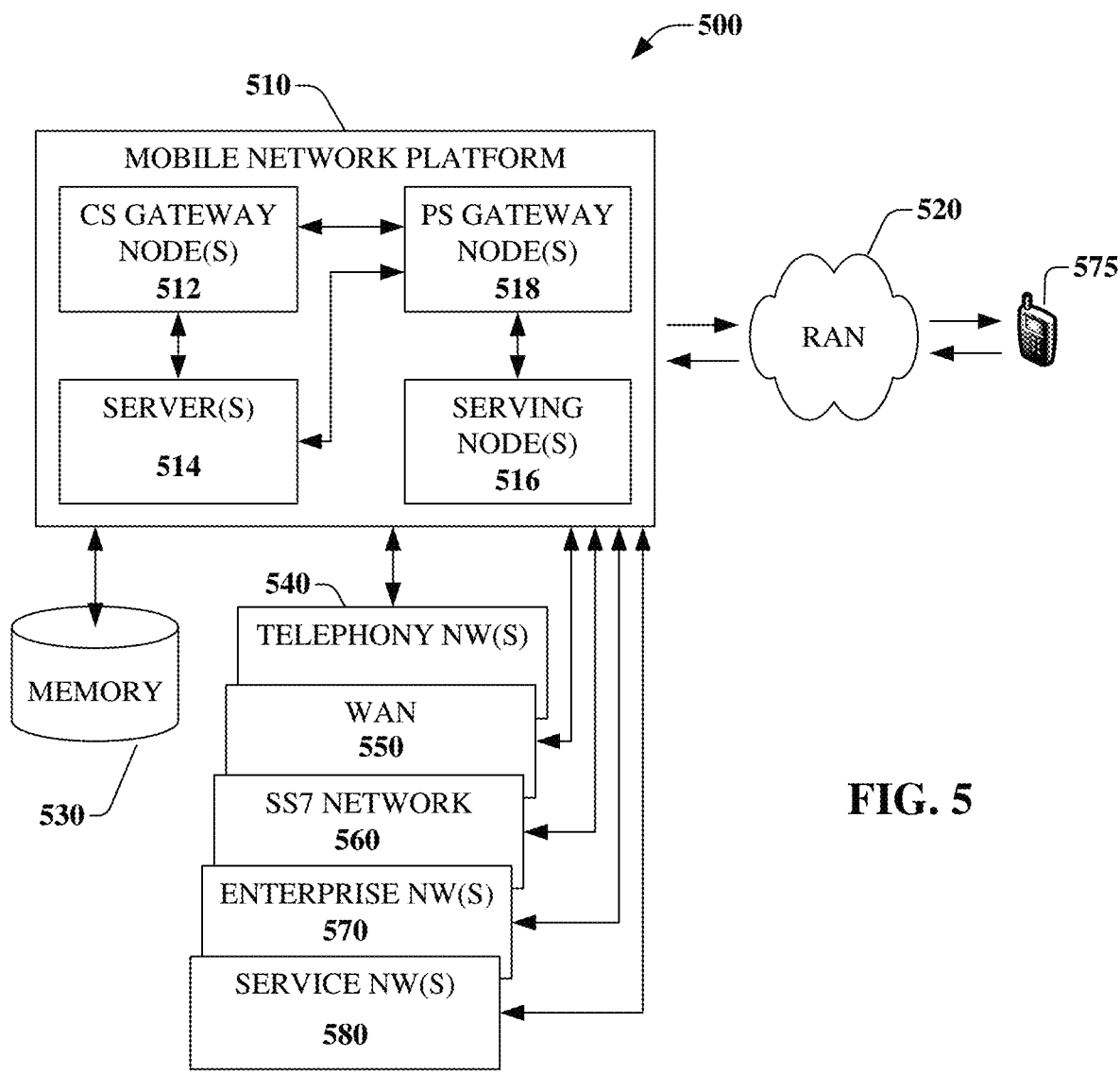
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part predicting a future viewport of the video frame based on head movement traces, identifying points of interest, and enhancing viewport prediction results by analyzing moving objects, heatmaps and saliency maps of the video content. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
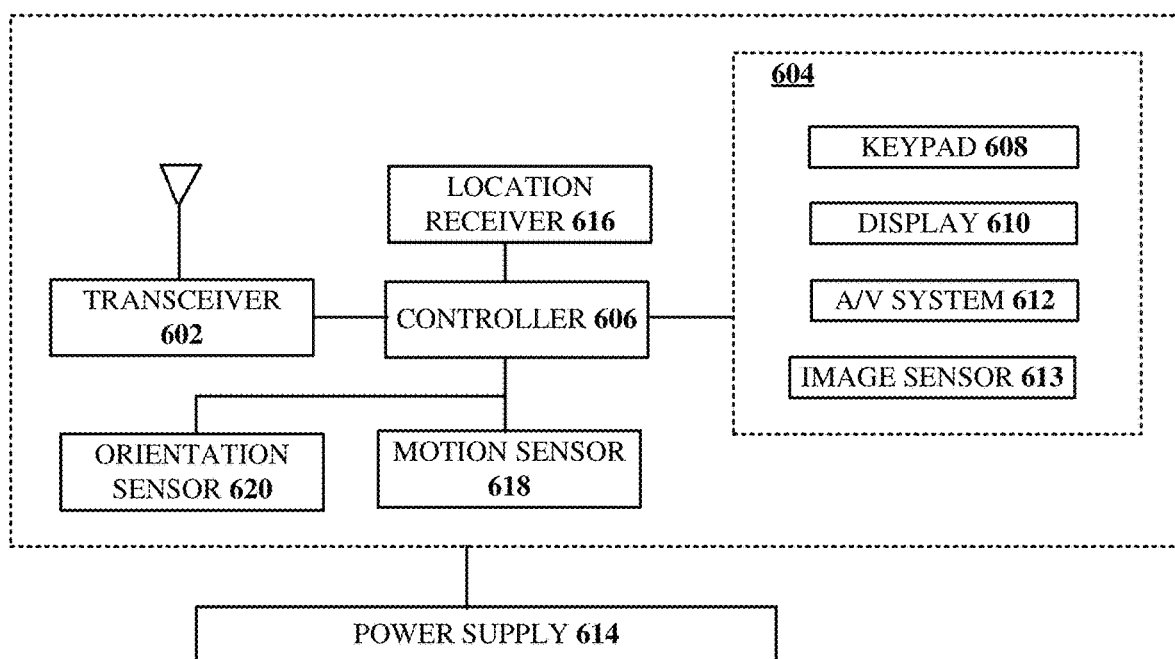
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part predicting a future viewport of the video frame based on head movement traces, identifying points of interest, and enhancing viewport prediction results by analyzing moving objects, heatmaps and saliency maps of the video content.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/

GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x_1, x_2, x_3, x_4 \ldots x_n)$, to a confidence that the input belongs to a class, that is, $f(x)$=confidence(class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," "subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
   a processing system including a processor; and
   a memory that stores executable instructions that, when executed by the processing system, facilitate performance of operations, the operations comprising:
   collecting data corresponding to changes in a field-of-view for a video viewer, wherein the data is input by a user viewing a panoramic video on the video viewer;
   determining a present orientation of a display region presented at a first time on a display of the video viewer;
   predicting a future orientation of the display region occurring at a second time based on the data collected, to obtain a predicted orientation of the display region to be presented at the second time on the display of the video viewer;
   identifying, based on the predicted orientation of the display region and the field-of-view, a first spatial region of a video frame of the panoramic video corresponding to the second time, wherein the video frame comprises the first spatial region;

identifying a plurality of objects moving in the video frame from the first time to the second time, wherein a first object of the plurality of objects is located in a second spatial region of the video frame at the second time; and facilitating a wireless transmission of a first group of tiles covering the first spatial region of the video frame and a second tile covering the second spatial region of the video frame to the video viewer before the second time, for a potential presentation at the video viewer at the second time, wherein the first spatial region and the second spatial region are non-overlapping.

2. The device of claim 1, wherein a first distance from the first object to a center of the first spatial region is shorter than any distance from any other object in the plurality of objects to the center of the first spatial region.

3. The device of claim 1, wherein the operations further comprise:

generating a heatmap for the video frame corresponding to the second time;

identifying, based on the heatmap, a first group of points of interest in the video frame; and facilitating the wireless transmission of a third tile covering a third spatial region of the video frame comprising a first point of interest in the first group of points of interest to the video viewer, before the second time, wherein the third spatial region is non-overlapping with the first spatial region and the second spatial region.

4. The device of claim 3, wherein the first point of interest corresponds to a hottest area in the heatmap.

5. The device of claim 4, wherein the operations further comprise:

generating a saliency map for the video frame corresponding to the second time;

identifying, based on the saliency map, a second group of points of interest in the video frame; and facilitating the wireless transmission of a fourth tile covering a fourth spatial region of the video frame comprising a second point of interest in the second group of points of interest to the video viewer, before the second time, wherein the fourth spatial region is non-overlapping with the first spatial region, the second spatial region and the third spatial region.

6. The device of claim 5, wherein the second point of interest corresponds to a most obvious region in the saliency map.

7. The device of claim 6, wherein the operations further comprise decoding tiles by priority, wherein a priority order comprises the first group of tiles, the second tile, the third tile, and the fourth tile.

8. The device of claim 7, wherein a second object of the plurality of objects is located in a fifth spatial region of the video frame at the second time, wherein the first spatial region and the fifth spatial region are non-overlapping, and wherein the operations further comprise facilitating the wireless transmission of a fifth tile covering the fifth spatial region of the video frame to the video viewer before the second time, for the potential presentation at the video viewer at the second time.

9. The device of claim 1, wherein the data comprises head movement traces from sensors built into the device.

10. The device of claim 9, wherein the device comprises a mobile device, and where the processing system comprises a plurality of processors operating in a distributed processing environment.

11. A non-transitory, machine-readable medium, comprising executable instructions that, when executed by a processing system including a processor, facilitate performance of operations, the operations comprising:

collecting data corresponding to changes in a field-of-view for a video viewer, wherein the data is input by a user viewing a panoramic video on the video viewer;

determining a present orientation of a display region presented at a first time on a display of the video viewer;

predicting a future orientation of the display region occurring at a second time based on the data collected, to obtain a predicted orientation of the display region to be presented at the second time on the display of the video viewer;

identifying, based on the predicted orientation of the display region and the field-of-view, a first spatial region of a video frame of the panoramic video corresponding to the second time, wherein the video frame comprises the first spatial region, and wherein a first group of tiles covers the first spatial region;

identifying a plurality of objects moving in the video frame from the first time to the second time, wherein each object of the plurality of objects is located in a separate spatial region of the video frame at the second time, wherein a second group of tiles collectively covers the separate spatial regions, wherein tiles in the first group of tiles and tiles in the second group of tiles are different;

generating a heatmap for the video frame corresponding to the second time;

identifying, based on the heatmap, a third group of tiles comprising points of interest in the video frame at the second time, wherein tiles in the third group of tiles are different from the tiles in the second group of tiles and the tiles in the first group of tiles;

generating a saliency map for the video frame corresponding to the second time;

identifying, based on the saliency map, a fourth group of tiles comprising the points of interest in the video frame at the second time, wherein tiles in the fourth group of tiles are different from the tiles in the third group of tiles, the tiles in the second group of tiles and the tiles in the first group of tiles; and facilitating wireless transmission of the first group of tiles, a second tile from the second group of tiles, a third tile from the third group of tiles, and a fourth tile from the fourth group of tiles for presentation at the video viewer at the second time.

12. The non-transitory, machine-readable medium of claim 11, wherein the tiles in the second group of tiles are sorted in a first priority order by distance from a center of the first spatial region, and wherein the second tile corresponds to an object in the plurality of objects that is closest to the center of the first spatial region.

13. The non-transitory, machine-readable medium of claim 12, wherein the tiles in the third group of tiles are sorted in a second priority order by hotness in the heatmap, and wherein the third tile corresponds to a hottest region in the heatmap.

14. The non-transitory, machine-readable medium of claim 13, wherein the tiles in the fourth group of tiles are sorted in a third priority order by saliency in the saliency map, and wherein the fourth tile corresponds to a most salient region in the saliency map.

15. The non-transitory, machine-readable medium of claim 14, wherein the data comprises head movement traces from sensors built into a device.

16. The non-transitory, machine-readable medium of claim 15, wherein the device comprises a mobile device, and wherein the processing system comprises a plurality of processors operating in a distributed processing environment.

17. A method, comprising:
- determining, by a processing system including a processor, a present orientation of a display region presented at a first time on a display of a video viewer;
- predicting, by the processing system, a future orientation of the display region occurring at a second time based on data collected, to obtain a predicted orientation of the display region to be presented at the second time on the display of the video viewer;
- identifying, by the processing system, based on the predicted orientation of the display region, a first group of tiles from a video frame of a panoramic video being displayed by the video viewer, wherein the first group of tiles covers the display region in the video frame at the predicted orientation;
- identifying, by the processing system, a plurality of objects moving in the video frame from the first time to the second time, wherein each object of the plurality of objects is located in a separate spatial region of the video frame at the second time, wherein a second group of tiles collectively covers the separate spatial regions, wherein tiles in the first group of tiles and tiles in the second group of tiles are different; and
- facilitating a wireless transmission, by the processing system, of the first group of tiles and a second tile from the second group of tiles, for a presentation at the video viewer at the second time.

18. The method of claim 17, comprising:
- generating, by the processing system, a heatmap for the video frame corresponding to the second time;
- identifying, by the processing system, based on the heatmap, a third group of tiles comprising points of interest in the video frame at the second time, wherein tiles in the third group of tiles are different from the tiles in the second group of tiles and the tiles in the first group of tiles; and
- facilitating the wireless transmission, by the processing system, a third tile in the third group of tiles for the presentation at the video viewer at the second time.

19. The method of claim 18, comprising:
- generating, by the processing system, a saliency map for the video frame corresponding to the second time;
- identifying, by the processing system, based on the saliency map, a fourth group of tiles comprising the points of interest in the video frame at the second time, wherein tiles in the fourth group of tiles are different from the tiles in the third group of tiles, the tiles in the second group of tiles and the tiles in the first group of tiles; and
- facilitating the wireless transmission, by the processing system, a fourth tile in the fourth group of tiles for the presentation at the video viewer at the second time.

20. The method of claim 19, wherein the tiles in the second group of tiles are sorted in a first priority order by distance from a center of the first group of tiles, wherein the second tile corresponds to an object in the plurality of objects that is closest to the center of the first group of tiles,
- wherein the tiles in the third group of tiles are sorted in a second priority order by hotness in the heatmap, and wherein the third tile corresponds to a hottest region in the heatmap,
- wherein the tiles in the fourth group of tiles are sorted in a third priority order by saliency in the saliency map, and wherein the fourth tile corresponds to a most salient region in the saliency map.

* * * * *